E. ABBE.
DOUBLE PRISM FOR TOTALLY REFLECTING REFRACTOMETERS.
No. 548,495. Patented Oct. 22, 1895.
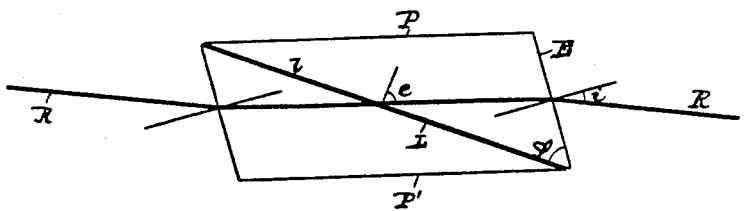

UNITED STATES PATENT OFFICE.

ERNST ABBE, OF JENA, GERMANY, ASSIGNOR TO THE FIRM OF CARL ZEISS, OF SAME PLACE.

DOUBLE-PRISM FOR TOTALLY-REFLECTING REFRACTOMETERS.

SPECIFICATION forming part of Letters Patent No. 548,495, dated October 22, 1895.

Application filed October 28, 1893. Serial No. 489,227. (No model.) Patented in Germany January 5, 1892, No. 65,803; in France June 30, 1892, No. 222,728, and in England December 10, 1892, No. 22,751.

*To all whom it may concern:*

Be it known that I, ERNST ABBE, doctor of philosophy, a subject of the Grand Duke of Saxe-Weimer, residing at Jena, in the Grand Duchy of Saxe-Weimer-Eisenach, Germany, have invented new and useful Improvements in Double Prisms for Totally-Reflecting Refractometers, (for which I have obtained patents in Germany No. 65,803, bearing date January 5, 1892; in France No. 222,728, bearing date June 30, 1892, and in England No. 22,751, bearing date December 10, 1892,) of which the following is a specification.

This invention relates to double prisms to be employed in the construction of totally-reflecting refractometers, and has for its object to enable the prism itself to produce the achromatization of the critical line of the total reflection.

It is known that the differences which exist between the refractive power of liquids or semiliquids can be accurately ascertained and measured by inclosing the substance to be observed in the form of a thin layer or film between two glass prisms, the angles of which are equal but opposite, and determining the angle of incidence under which the light has to be caused to pass through these two prisms to undergo total reflection upon the intermediate layer of liquid. This method has already been applied to practical purposes—such, for example, as the determination of the degree of purity of oils and fats, the degree of concentration of solutions, or the like.

Let it be supposed that the liquid constituting the aforesaid intermediate layer possesses a refraction inferior to that of the glass. If under these conditions an illuminated surface is looked at by the medium of a double prism containing the said liquid in the form of a thin layer between its two constituent prisms, one half of the field of view appears light, while the other half is perfectly dark, owing to the total reflection of the luminous rays. By the aid of a telescope it is possible to observe, either upon a scale arranged within the field of the eyepiece or upon a graduated arc of the circle, on the center of which the telescope turns, the direction in which the critical line of the total reflection is placed relatively to the faces of the prism, and finally to deduct therefrom the refractive index of the liquid constituting the intermediate layer. The apparatus, which have heretofore been based upon this method of observation in view of practical purposes, and which are termed "totally-reflecting refractometers," present the defect that the critical line of total reflection is not achromatic. This is due to the fact that the position of the said line is different for the differently-colored constituents of white light. In order to obtain an accurate observation of this critical line, it is necessary to have recourse to homogeneous or monochromatic light, or in the case of white light to complicate the apparatus by providing it with a special arrangement (compensator) acting so as to compensate for the dispersion of colors occurring when the reflection is total by a prismatic dispersion.

The improvements forming the object of the present invention enable these difficulties to be overcome in refractometers employed for verifying or examining a definite substance or a definite class of substances—such, for example, as a definite kind or class of oil or fat, a definite kind of solution, or the like. In this case the achromatization of the critical line of total reflection can be obtained by the double prism itself, and this with a degree of precision sufficient for all practical purposes. For this purpose it is simply necessary to construct the double prism in such a manner that when the reflection is total the dispersion taking place at that moment on the limit between the glass and the liquid will be neutralized by an equal but opposed dispersion on the face of emergence of the prism on the side of the observer. If the optical constants, refractive index, and dispersive power or dispersion of the liquid to be tested, as well as of the glass the double prism is to be constructed with, are known, any optician versed in the treatment of problems of this kind will be enabled by the following directions to numerically determine according to known methods the elements required for the prism.

On the annexed diagram, P and P' are the two prisms. L is the liquid interposed between the same; $l$, the limiting surface between L and P; R, a ray of light, and E the surface of emergence.

e indicates the critical angle of the total reflection relatively to the mean color and the angle of refraction of the prism, and i the angle of incidence relatively to the face of emergence of the prism.

The optical signs employed in the following denote: $n$=mean index of refraction of the liquid. $n^D$=index of refraction of the liquid relatively to the D line of the spectrum. $n^C$=index of refraction of the liquid relatively to Fraunhofer's line C. $n^F$=index of refraction of the liquid relatively to Fraunhofer's line F. $\Delta n$=difference between the refractive indices of the liquid for two different colors. $\frac{\Delta n}{n}$=dispersive power or dispersion of the liquid. $N$=mean index of refraction of the glass. $\Delta N$=difference between the refractive indices of the glass for two different colors. $\frac{\Delta N}{N}$=dispersive power or dispersion of the glass.

Supposing it be known the refractive index $n$ and the dispersive power $\frac{\Delta n}{n}$ of the liquid or body to be tested, as well as the refractive index $N$ and the dispersive power $\frac{\Delta N}{N}$ of the glass to be employed in constructing the prism, by using well-known methods of calculation—viz., by means of the formulæ given at the end of this paragraph—we first determine the critical angle $e$ of the total reflection for the mean color, and then the difference between the critical angles $e$ of the total reflection for two different colors—as, for instance, Fraunhofer's lines C and F. This difference constitutes the measure for the dispersion on the limit surface $l$, occurring with the said liquid and glass on the reflection being total. Then we proceed to determine the refractive angle $\varphi$ required for the prism, and finally that angle of incidence $i$ on the surface of emergence E with which the dispersion produced by the refraction of the light on this surface will be of equal magnitude, but of reverse character, as the dispersion that takes place on the surface $l$ when the reflection becomes total. The several formulæ to be used for these calculations are, in their order of application, First. $N \sin. e = n.$ Second. $\mathrm{Tang.}\,(\varphi - e) = \frac{1}{\cos. e}\left(\frac{\Delta n}{\Delta N} - \frac{n}{N}\right).$ Third. $r = \varphi - e.$ Fourth. $\sin. i = \sin. r . N.$ $r$ indicates that angle within the glass which the ray of light forms, with a plane set at a right angle to the face of the prism.

A prism constructed according to this rule produces, without the aid of any other device, a critical line of the total reflection, which is colorless so long as the substance composing the intermediate layer remains unchanged.

The aforesaid condition for the construction of the prism can be realized with any kind of glass within certain limits. In order, however, to reduce as much as possible the angle at which the light is to be looked at through the prism, the latter should be composed of a glass of which the quotient $\frac{\Delta n}{n}$ approaches as nearly as possible the quotient $\frac{\Delta N}{N}$ of the liquid or body to be tested.

It is most advantageous to employ in the composition of the prism a kind of glass with which the value of the aforesaid quotient approaches as nearly as possible that of the substance in question. In this case the necessary compensation can be obtained with a small angle of incidence $i$ or even with perpendicular incidence.

The following are given as examples of the construction of the double prisms for refractometers, according to this invention.

EXAMPLE I.—*Double prism to be employed in the examination of butter.*

|  | $n^D$ | $\Delta n = n^F - n^C$ | $\frac{\Delta n}{n}$ |
|---|---|---|---|
| Butter, melted | 1.4572 | 0.000841 | 0.00577 |
| Crown glass 0.871 | 1.5395 | 0.00904 | 0.00587 |

In this case the angles $e$, $\varphi$, and $i$ will be found to be: $e = 71° 10'$ relatively to the D line of the spectrum. $\varphi = 68° 19'$. $i = -4° 26'$ relatively to the D line of the spectrum, the minus sign indicating that the emerging ray inclines toward the refringent edge.

EXAMPLE II.—*Double prism to be employed in the examination of solution of fat of milk in ether.*

|  | $n^D$ | $\Delta n = n^F - n^C$ | $\frac{\Delta n}{n}$ |
|---|---|---|---|
| Solution of fat of milk of average strength | 1.3736 | 0.00577 | 0.00478 |
| Crown glass 0.802 | 1.4907 | 0.00705 | 0.00511 |

In this case the values of the angles are as follows: $e = 66° 36'$. $\varphi = 58° 10'$. $i = 12° 42'$.

The double prisms constructed as hereinbefore described may be made of any required dimensions. They may be provided with any kind of supports or cases according to the purposes for which they are required, such as cases made with hollow sides or walls for the purpose of regulating the temperature by means of hot water, for example. A telescope is combined with the prism in the usual manner. In order to measure differences in the refractive power of the substances under examination, a graduated scale may be combined with the lens of the eyepiece in the usual manner, or the double prism may be rotatably arranged relatively to the axis of the telescope and combined with a graduated arc of a circle. When the substances to be examined possess the same refractive power, but differentiate with regard to their dispersive power, it is sufficient to observe the colored critical line in place of the achromatized line, and in this case the assistance of means for reading off the results and adjusting the apparatus and the telescope may all be dispensed with.

What I claim is—

In totally reflecting refractometers for testing definite substances or classes of substances, a double prism so constructed that the refraction angle $\varphi$ of the prism and the angle of incidence $i$ on the face of emergence of same, cause a dispersion of the light on the said face equal in amplitude but of opposite character to the dispersion occurring on the limit face $l$ when the reflection is total.

In testimony whereof I have hereunto set my hand in the presence of two subscribing witnesses.

ERNST ABBE.

Witnesses:
 RUD. E. FRICKE,
 ADOLPH SECDORFF.